United States Patent
Yamada (10) Patent No.: US 6,619,607 B2
(45) Date of Patent: Sep. 16, 2003

(54) FOLDING CUP HOLDER

(75) Inventor: Satoshi Yamada, Kanagawa-ken (JP)

(73) Assignee: Piolax Inc., Kanagawa-Ken (JP)

( * ) Notice: Subject to any disclaimer, the term of this patent is extended or adjusted under 35 U.S.C. 154(b) by 0 days.

(21) Appl. No.: 10/199,124

(22) Filed: Jul. 22, 2002

(65) Prior Publication Data

US 2003/0015638 A1 Jan. 23, 2003

(30) Foreign Application Priority Data

Jul. 23, 2001 (JP) ..................................... P2001-221228

(51) Int. Cl.[7] .............................. A47K 1/08; B60R 7/00
(52) U.S. Cl. ................................ 248/311.2; 248/282.1; 224/282; 224/926
(58) Field of Search ........................... 248/311.2, 316.5, 248/291.5, 292.11, 292.13; 224/926, 282.1, 275; 297/188.01, 188.08, 188.19

(56) References Cited

U.S. PATENT DOCUMENTS

| | | | | |
|---|---|---|---|---|
| 5,167,392 A | * | 12/1992 | Henricksen | 248/311.2 |
| 5,505,417 A | * | 4/1996 | Plocher | 248/311.2 |
| 5,671,877 A | * | 9/1997 | Yabuya | 224/282 |
| 5,865,411 A | * | 2/1999 | Droste et al. | 248/311.2 |
| 6,085,953 A | * | 7/2000 | Bober et al. | 224/282 |
| 6,227,509 B1 | * | 5/2001 | Plocher et al. | 248/311.2 |
| 6,439,525 B1 | * | 8/2002 | Gehring et al. | 248/311.2 |
| 6,485,097 B1 | * | 11/2002 | Yuzawa | 297/188.01 |
| 6,520,575 B1 | * | 2/2003 | Yuzawa | 297/188.01 |

FOREIGN PATENT DOCUMENTS

| | | |
|---|---|---|
| JP | 10278652 | 10/1998 |
| JP | 20008687 | 1/2000 |

OTHER PUBLICATIONS

US 2003/0062458 A1 (Leopold et al.) Apr. 3, 2003 "Glass Holder".*
English Language Abstract for JP Appln. No. 10–278652.
English Language Abstract for JP Appln. No. 2000–8687.

* cited by examiner

Primary Examiner—Korie Chan
Assistant Examiner—Amy J. Sterling
(74) Attorney, Agent, or Firm—Greenblum & Bernstein, P.L.C.

(57) ABSTRACT

A folding cup holder is provided with a base plate; a pair of first arms having proximal end portions, being pivotally supported to the base plate; a pair of second arms each including a resilient latch portion, being pivotally supported to the base plate at proximal end portions thereof respectively; and a holder arm including a pair of engagement portions at both ends thereof and pivotally supported to the distal ends of the first arms and the distal ends of the second arms in differential axes. The engagement portions are engaged with the latch portions so that the holder arm is kept in an expanded state. The latch portions are resilient so that the engagement portions are allowed to override the resilient latch portions, thereby the holder arm is released to be free when excessive force is applied to the holder arm.

5 Claims, 8 Drawing Sheets

FOLDING CUP HOLDER

BACKGROUND OF THE INVENTION

1. Field of the Invention

The present invention relates to a folding cup holder attached to an interior of a passenger compartment in an automobile, and more particularly to a folding cup holder having a structure which does not easily break even when an accidental external force is applied.

2. Description of the Related Art

Various kinds of equipment such as a cup holder are mounted to the interior of the passenger compartment in an automobile for the convenience of the passenger. There are cup holders which are built into the interior, however, there is proposed cup holders of an add-on type. The add-on type cup holder is proposed as a folding structure, which does not obstruct the passenger when it is not in use.

Japanese Patent Application Laid-open No. 10-278652 shows such an art of the folding cup holder as mentioned above. This folding cup holder is structured such that the folding cup holder is fixed to a wall surface or the like of the interior, can be folded compactly when not being used, and can be expanded forward at a time of use. When the cup holder expands forward, a holder arm holding the cup is apart from the wall surface, so that there is a feature that the cup can be easily put in and removed.

SUMMARY OF THE INVENTION

According to the folding cup holder mentioned above, it is necessary to make the holder arm and the structure for supporting the holder arm narrow and small, for the purpose of achieving both of matters that the cup holder can be folded compactly and the cup holder can be expanded largely. Accordingly, it is hard to particularly structure the holder arm so as to stand against the external force, and there is a risk that the holder arm is broken in the case that an accidental external force is applied in a state in which the cup holder is expanded.

The present invention is made in view of the above problem, and an object of the present invention is to provide a folding cup holder having a structure which is not easily broken even when an accidental external force is applied.

According to the present invention, the folding cup holder is provided with a base plate; a pair of first arms each having proximal end portion pivotally supported to the base plate; a pair of second arms each including a resilient latch portion and having proximal end portion pivotally supported to the base plate; and a holder arm including a pair of engagement portions at both ends thereof and pivotally supported to the distal ends of the first arms and the distal ends of the second arms in differential axes. The engagement portions are engaged with the latch portions so that the holder arm is kept in an expanded state. The latch portions are resilient so that the engagement portions are allowed to override the resilient latch portions, thereby the holder arm is released when an excessive force is applied to the holder arm.

Since the holder arm holding the cup is pivotally supported on the differential axes of the first and second arms, the holder arm can be compactly folded up along the base plate when they are not used, and can be largely expanded forward when they are used. Further, since the flexible latch portions are employed for the purpose of keeping the expanded state mentioned above, they are released so that the holder arm can be free to swing downward when the accidental external force is applied. Thereby it is possible to prevent the holder arm from being broken.

Preferably, the latch portions and the engagement portions are disposed near the shafts of the holder arm and the second arms. Accordingly, in the case that the holder arm is not moved greatly even when external force is applied, an engagement between the latch portions and the engagement portions can not be cancelled.

More preferably, the holder arm and the second arms are provided with two pairs of pivots and bearings, each pivot including a key and each bearing including a keyway, and the keys and the keyways are not aligned to fit to each other at a position in a stare in which the holder arm is expanded so that the pivots are prevented from displacing from the bearings. Accordingly, when accidental external force is applied to the holder arm, the pivots are prevented from displacing from the bearings in a state where the holder arm is expanded.

A relationship between the holder arm and the first and second arms is further preferably set so that the holder arm is disposed on the outer side of the second arm and on the inner side of the first arm. Accordingly, since the first and second arms restrict deformation of the holder arm when a force is applied thereto, it is possible to prevent the shafts from displacing due to the deformation.

Further preferably, the first and second arms are provided with yoke portions therebetween in an integral manner, respectively. Since the first and second arms are reinforced in a width direction, it is possible to more securely prevent the deformation.

DETAILED DESCRIPTION OF THE PREFERRED EMBODIMENT

A description will be given below of an embodiment according to the present invention with reference to the accompanying drawings.

The present embodiment corresponds to a cup holder which is mainly intended to be applied to side surfaces beside rear seats in a sport-utility vehicle (SUV), however, of course, it is not limited to this.

Figure 1:
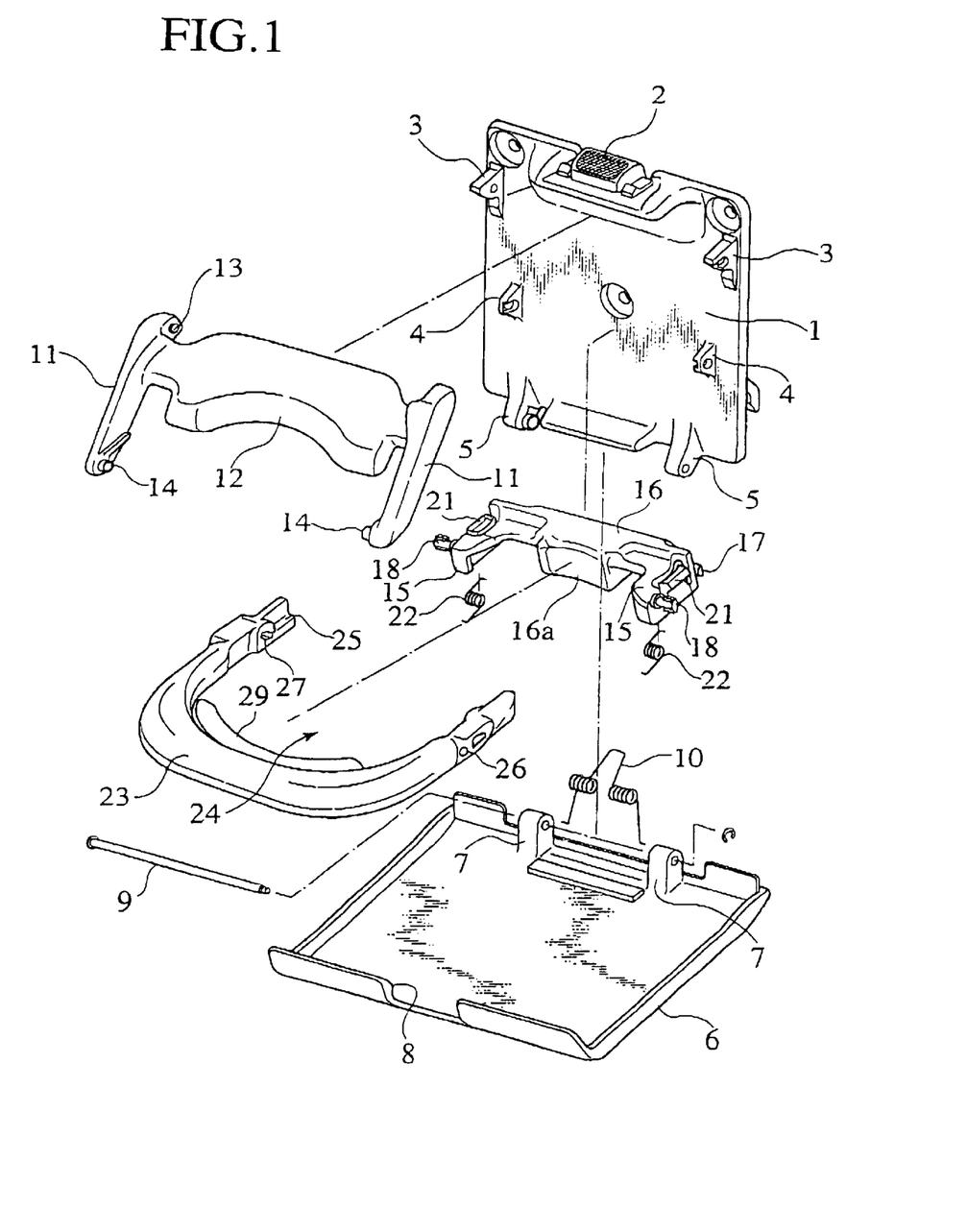
FIG. 1 is an exploded perspective view of a folding cup holder according to an embodiment of the present invention.

A folding cup holder according to the present invention is provided with a base plate 1 for fixing to an Inner wall surface of a passenger compartment, a pair of first arms 11 being pivotally supported to the base plate 1 at the proximal end portions thereof, a pair of second arms 15 respectively having latch portions 21 and being pivotally supported to the base plate 1 at the proximal end portions thereof, and a holder arm 23 which is provided with a pair of engagement portions 25 at both ends and is pivotally supported to the distal ends of the first arms 11 and distal ends of the second arms 15 by differential axes. Further, the base plate 1 is provided with a cover 6 axially supported by a shaft 9 at a lower end thereof.

The base plate 1 is formed with Its outline in a substantially square shape, and is provided with a lock piece 2 at an upper end thereof, a pair of protruding first bearings 3 at both ends on a slightly lower side thereof, a pair of protruding second bearings 4 at portions slightly closer to a center on a still lower side thereof, and a pair of protruding third bearings 5 at lower ends. A cover 6 is provided with a pair of bearings 7 protruding so as to correspond with the third bearings 5, and is axially supported to the base plate 1 by passing and inserting a shaft 9 through the bearings 5 and 7. A torsion coil spring 10 is fitted to the shaft 9 so as to force the cover 6 in a releasing direction. The cover 6 is provided with a lock groove 8 so as to correspond to the lock piece 2, and is structured so as to be detachably engaged.

The first arms 11 are further provided with a yoke portion 12 therebetween, which connects the first arms 11 integrally and also serves as a cup receiver. A pivot portion 13 and a pivot portion 14 are integrally provided in a protruding manner in a proximal end side and a distal end side of each of the first arms 11. The pivot portions 13 are respectively rotatably fitted to the first bearings 3 provided in the base plate 1 from Outer sides thereof, whereby the first arms 11 are pivotally supported to the base plate 1. The pivot portions 14 are rotatably fitted to bearings 26 mentioned below of the holder arm 23 from outer sides thereof.

Figure 2:
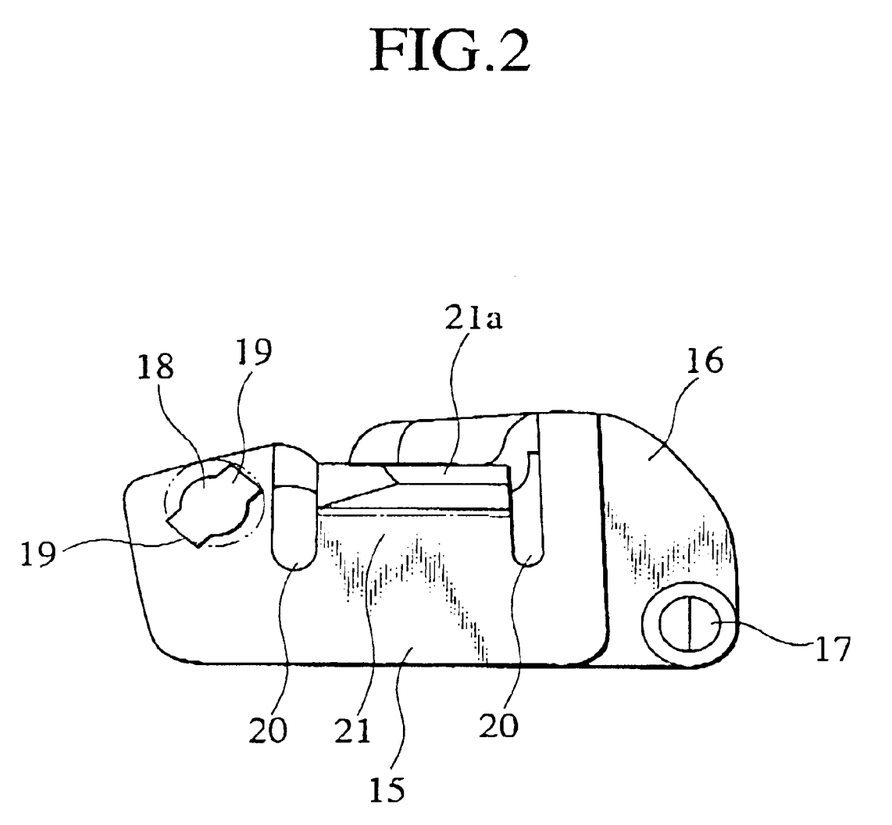
FIG. 2 is a side elevational view of second arms.
Figure 3:
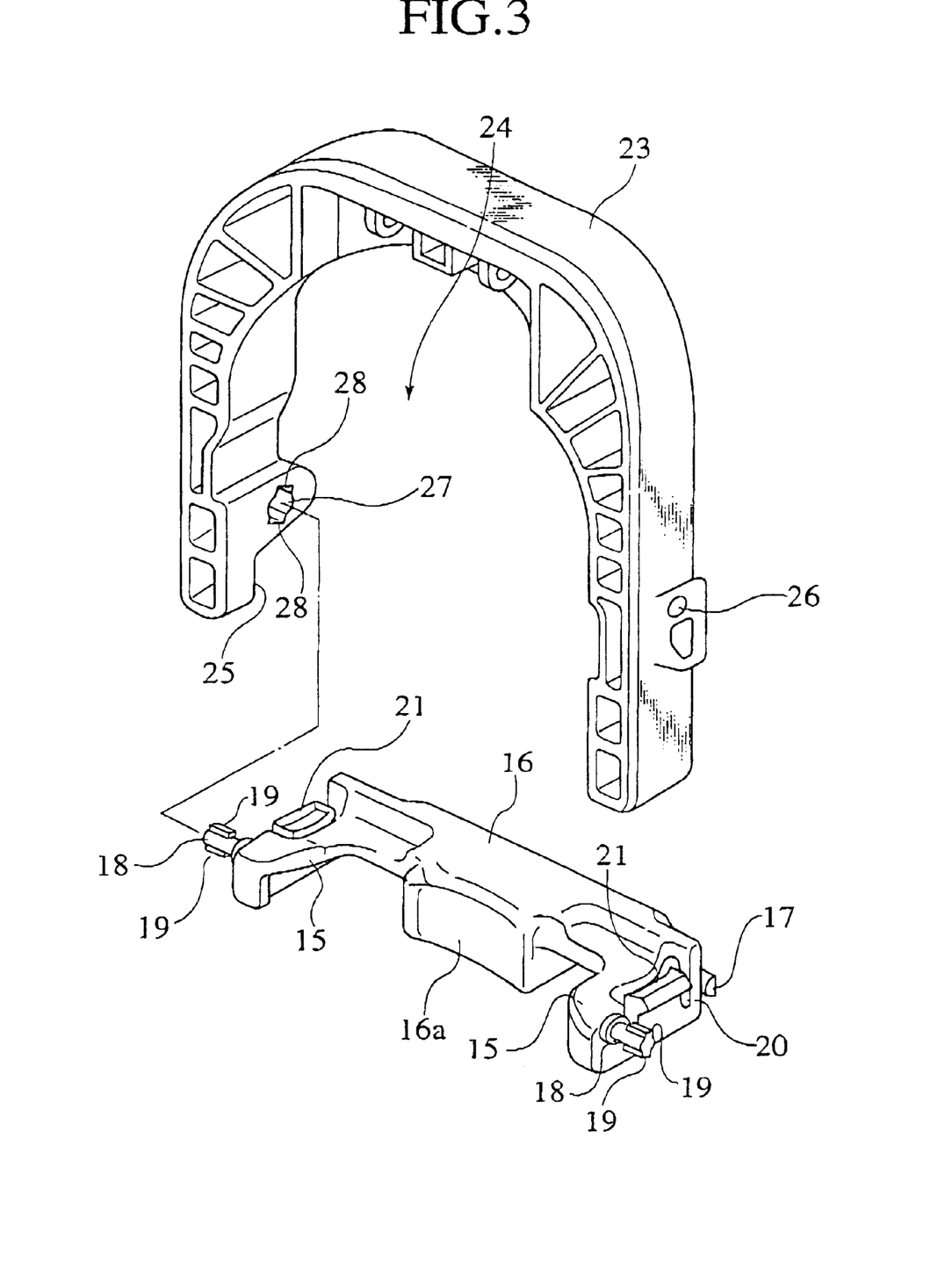
FIG. 3 is an exploded perspective view showing a relation between the second arms and holder arm.

A pair of second arms 15 is structured such that a yoke portion 16 integrally provided with a cup rest 16a integrally connects therebetween. A pivot portion 17 and a pivot portion 18 are integrally provided in a protruding manner to a proximal end side and a distal end side of each of the arms 15. The pivot portions 17 are respectively rotatably fitted to the second bearings 4 provided in the base plate 1 on the inner sides thereof, whereby the second arms 15 are pivotally supported to the base plate 1. The respective pivot portions 18 are structured such that a pair of keys 19 are provided in a protruding manner and can be aligned with a pair of keyways 28 provided in bearings 27 mentioned below of the holder arm 23. The pivot portions 18 are rotatably fitted to the bearings 27 respectively from the outer sides thereof, whereby the holder arm 23 is pivotally supported to the second arms 15. Further, torsion springs 22 are fitted between the pivot portions 18 and the bearings 27 so as to always force the holder arm 23 in an expanding direction. Flexible latch portions 21 are respectively provided in both sides of the second arms 15, and each of the latch portions 21 is provided with a hook 21a protruding to an outer side. A lower surface of the hook portion 21a forms a substantially horizontal surface and can be engaged with an engagement portion 25 mentioned below of the holder arm 23, and an upper surface thereof has a slant surface descending toward an outer side.

The holder arm 23 is formed in a U-shape, and an inner side thereof forms an opening 24 for holding the cup. A pair of bearings 26 is formed on the outer sides of both ends thereof and a pair of bearings 27 is formed on the inner sides thereof, respectively. The bearings 26 and 27 are provided so that positions thereof are deviated forward and backward. A pair of keyways 28 is provided near an opening of each of the bearings 27, and an inner portion thereof is formed in a cylindrical shape having a larger diameter than that near the opening, so as to allow the keys 19 mentioned above to rotate. The keys 19 and the keyways 28 are aligned with each other when the holder arm 23 is set to different positions from an expanded position. The inner sides of both ends of the holder arm 23 form engagement portions 25 having substantially horizontal surfaces, and are respectively engaged with the hooks 21a of the latch portions 21 mentioned above.

The holder arm 23 is further provided with a movable auxiliary piece 29, which is always energized in an inner direction of the holder arm 23 by a coil spring (not shown).

Next, a description will be given of a mode of use of the cup holder according to the present embodiment.

Figure 4:
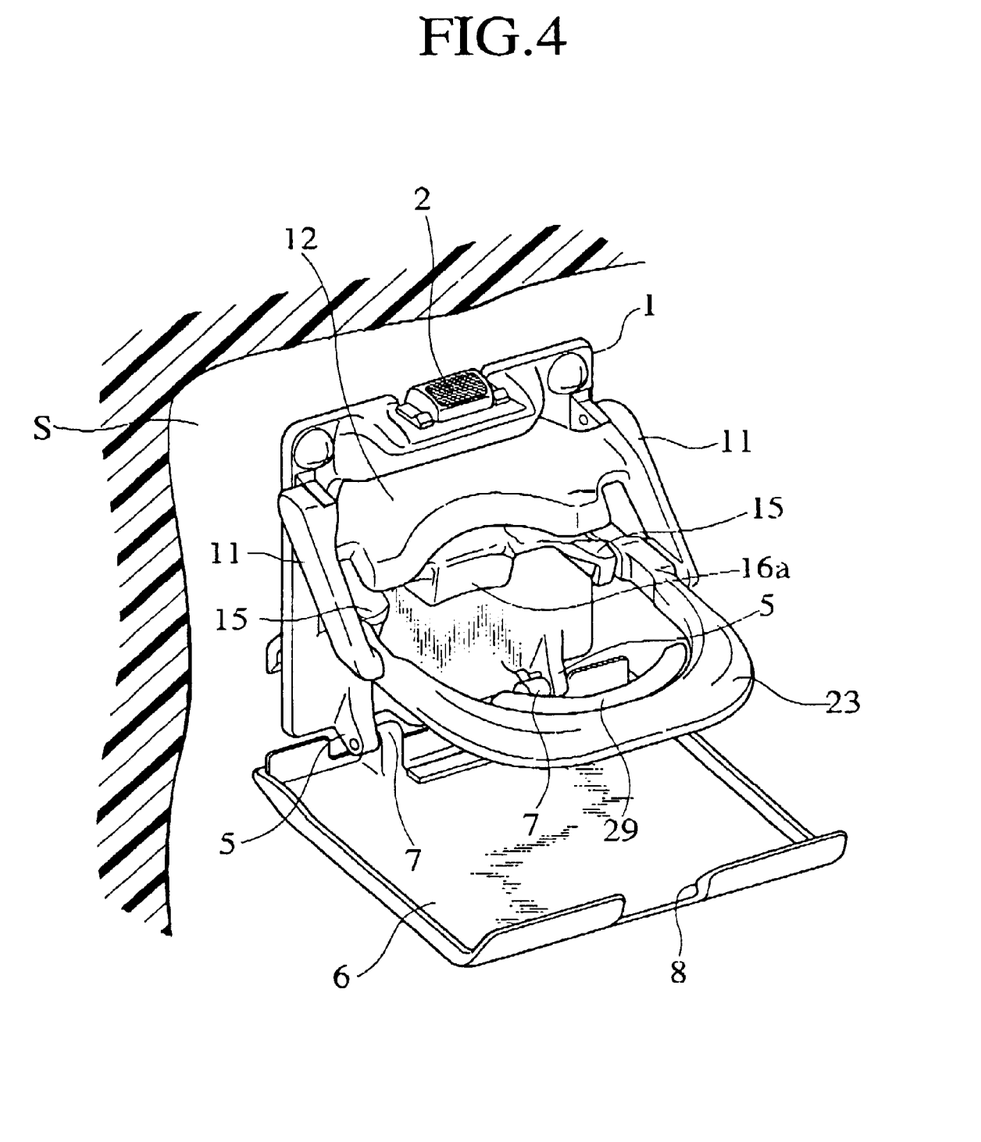
FIG. 4 is a perspective view showing a state in which the folding cup holder according to the embodiment of the present invention is in use.
Figure 5A:
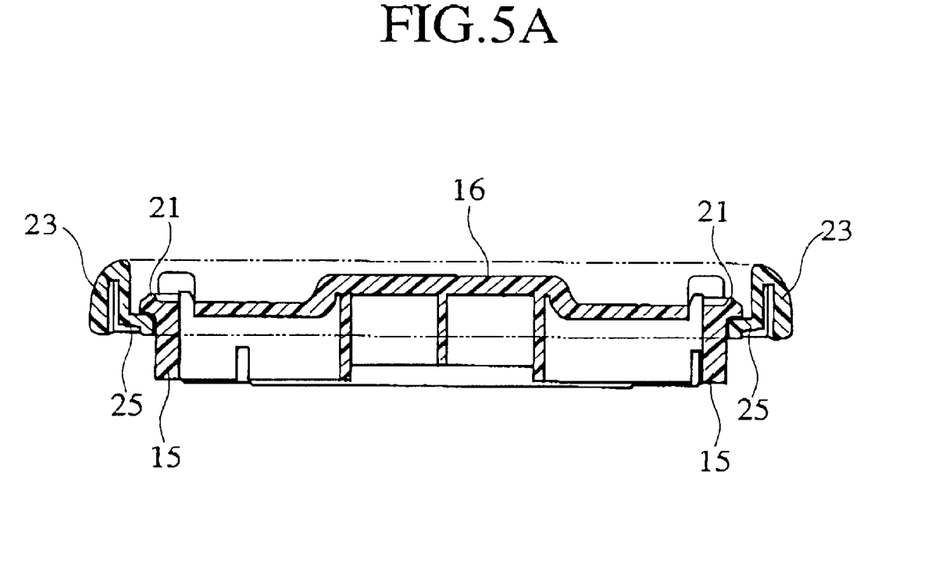
FIG. 5A is a cross sectional view of the second arms and the holder arm showing a state in which the holder arm is expanded and engagement portions are engaged with latch portions.
Figure 5B:
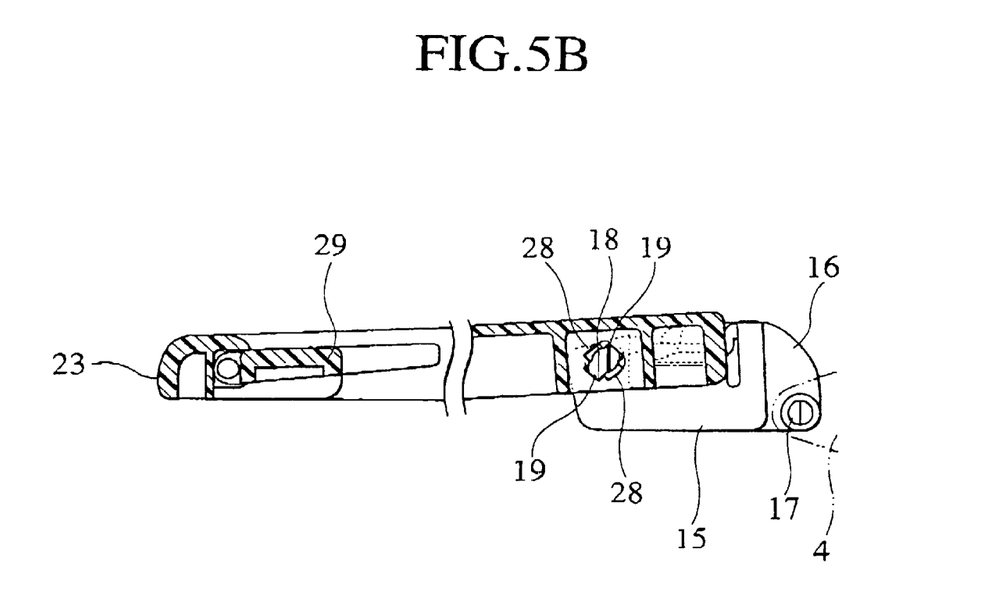
FIG. 5B is a partial cross sectional view of the second arms and the holder arm showing a state in which the holder arm is expanded and a key and a keyway are engaged with each other.

FIG. 4 shows a state in which the cup holder according to the present embodiment is expanded. The holder arm 23 is pivotally supported to the first and second arms 11 and 15, and is energized in an expanding direction by a repulsive force of the torsion springs 22 fitted to the pivot portions 18 in the second arms 15. Since the latch portions 21 of the second arms 15 is engaged with the engagement portions 25 of the holder arm 23, the holder arm 23 is maintained in a substantially horizontal state, as shown in FIG. 5A. Since the keys 19 and the keyways 28 are not aligned with each other in this state, as shown in FIG. 5B, the pivot portions 18 are prevented from displacing from the bearing 27.

In the state mentioned above, it is possible to insert the cup via the opening 24 of the holder arm 23. In correspondence to the size of the inserted cup, the auxiliary piece 29 swings downward so as to allow the cup to be inserted. When the cup is inserted, the holder arm 23, the cup receiver 12 and the cup rest 16a have an operation of supporting the cup in harmony. At this time, the cover 6 becomes also in a substantially horizontal state, and supports the cup inserted to the opening 24 of the holder arm 23 so as to function as a tray.

Figure 6:
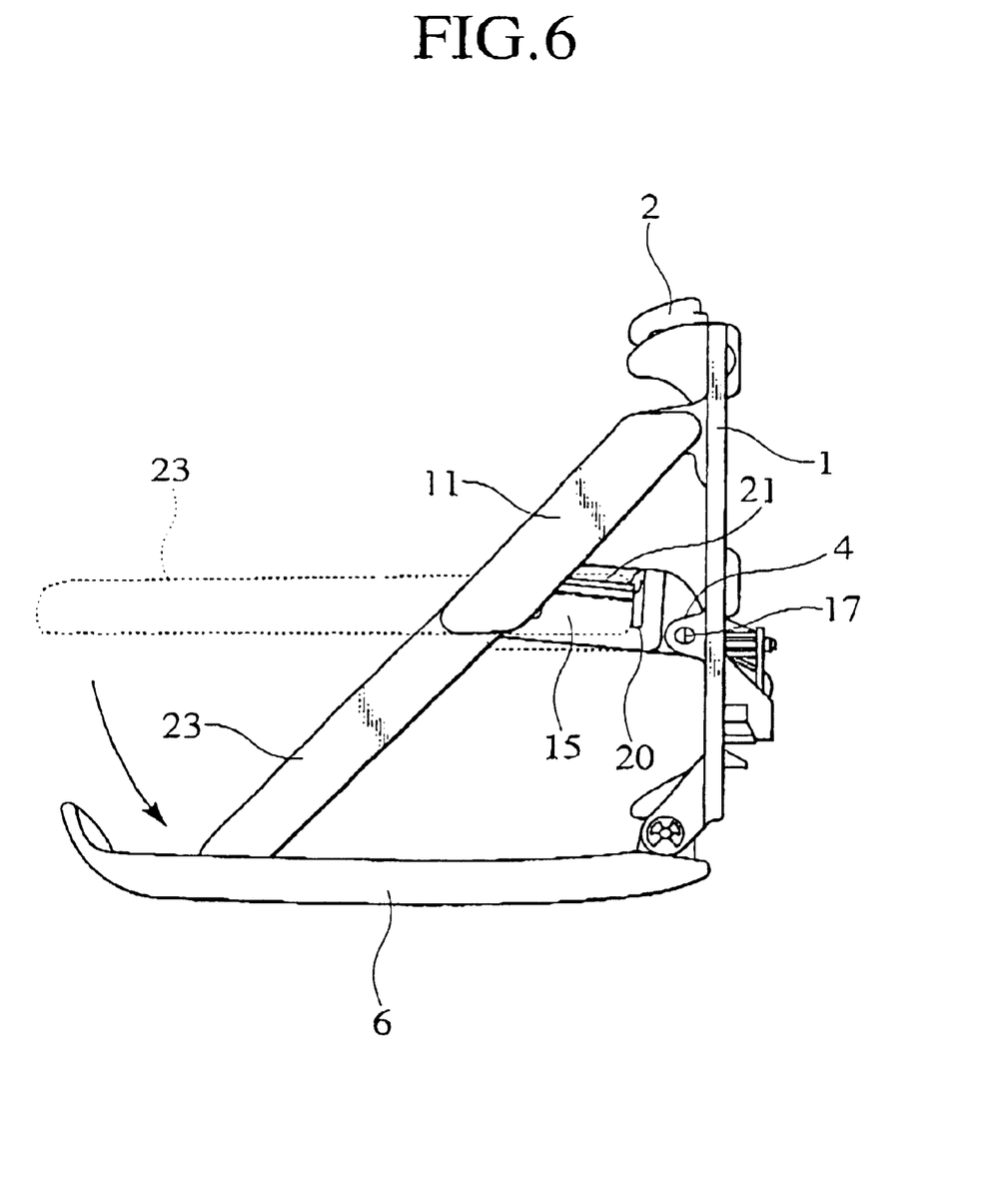
FIG. 6 is a side elevational view of the folding cup holder according to the embodiment of the present invention, showing a state in which an external force is applied to the holder arm and the engagement between the engagement portions and the latch portions is cancelled.
Figure 7:
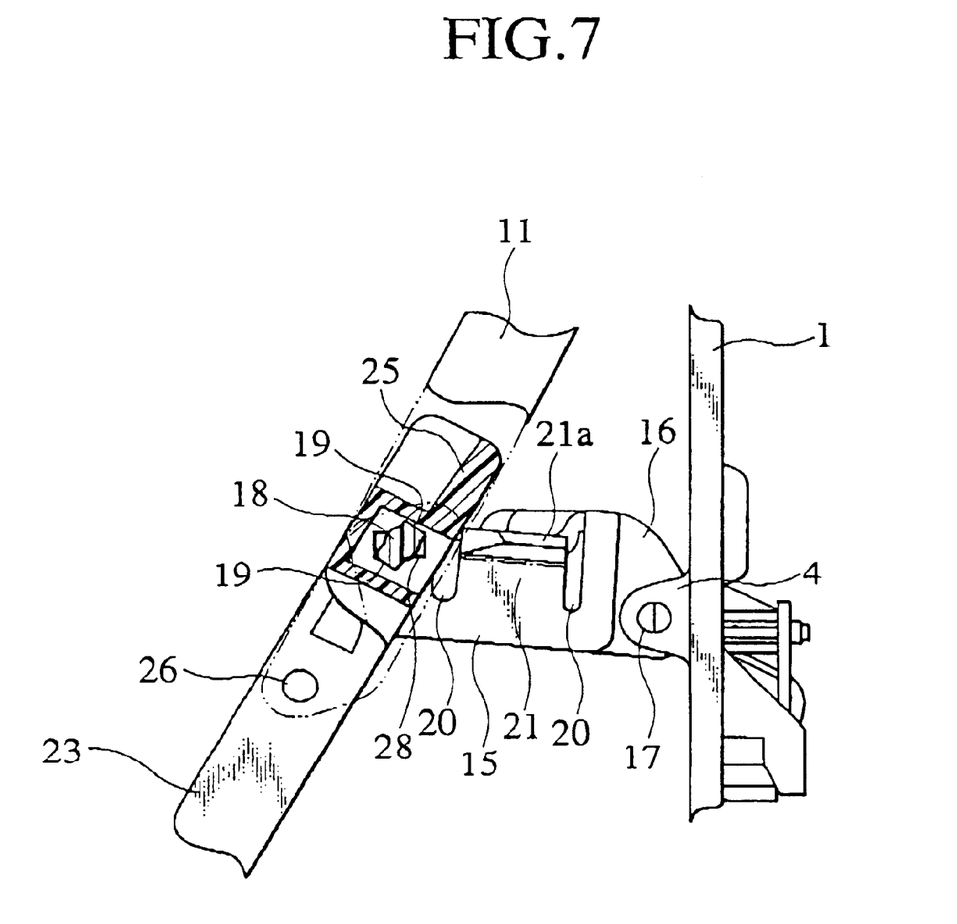
FIG. 7 is a partial cross sectional view of a main portion of the folding cup holder according to the embodiment of the present invention, showing a state in which the engagement between the engagement portion and the latch portion is cancelled.

Since the latch portions 21 are flexible, the latch portions 21 deflect inward upon the application of a large force so as to allow the engagement portions 25 to pass therethrough, as shown in FIG. 7. Accordingly, since the holder arm 23 can fall down to a lower side as shown in FIG. 6 when accidental force is applied to the holder arm 23, it is possible to prevent the holder arm 23, the bearings 26 and 27 and the like from being broken due to an excessive force application. In order to return this to the initial state, since the engagement portions 25 strike against the slanted upper surfaces of the hooks 21a so as to deflect the latch portions 21 to an inner side by rotating the holder arm 23 upward, the engagement portions 25 can easily ride over the hooks 21a. Accordingly, it is possible to easily return the holder arm 23 to a horizontal state.

The first arms 11 and the second arms 15 are respectively reinforced in a width direction by the yoke portions 12 and 16, and are hard to deform. Further, since the holder arm 23 is pivotally supported to outer sides of the second arms 15 and pivotally supported to inner sides of the first arms 11, these arms restrict the deformation in the width direction with each other. Accordingly, even when a force of deforming the holder arm 23 in the width direction is applied, it is possible to prevent the respective shafts from displacing. Since the pivot portions 18 and the keys 19 are not aligned with the keyways 28 in a state in which the holder arm 23 is expanded, but are fitted to the inner sides of the bearings 27, the pivot portions 18 and the bearings 27 are prevented from displacing.

Figure 8:
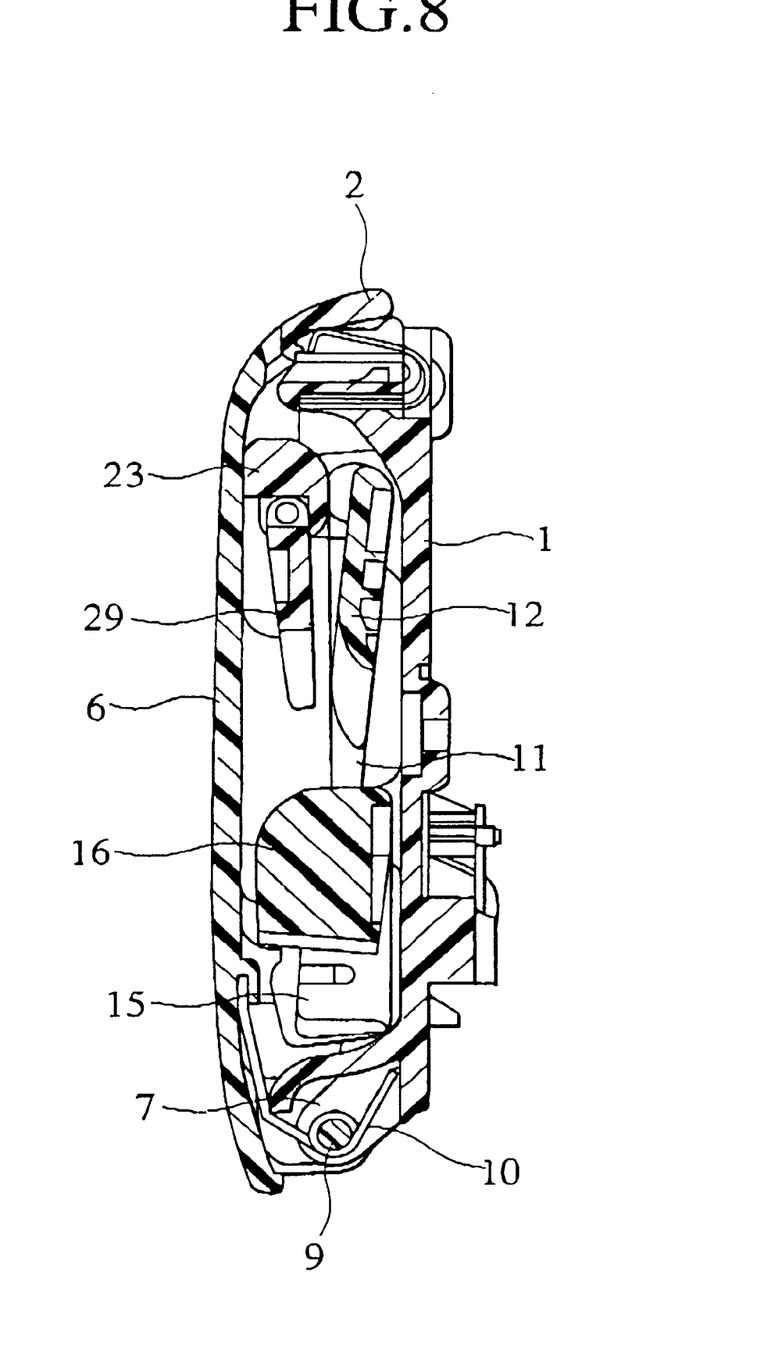
FIG. 8 is a cross sectional view of the folding cup holder according to the embodiment of the present invention, showing a folded state.

When the cup holder is not in use, the cover 6 is swung upward around the bearings 7. The holder arm 23 strikes against the cover 6, thereby being swung upward together. At this time, since the first arms 11 and the second arms 15 pivotally support the holder arm 23 in the differential axes, respectively, it is possible to swing downward. Accordingly, the respective arms are fold up within the cover 6. When completely closing the cover 6, the lock groove 8 is engaged with the lock piece 2, and a closed state shown in FIG. 8 is achieved.

The contents of Japanese Patent Application No. 2001-221228 (filed on Jul. 23, 2001) are incorporated herein by reference.

Although the invention has been described above by reference to certain embodiments of the invention, the invention is not limited to the embodiments described above. Modifications and variations of the embodiments described above will occur to those skilled in the art, in light of the above teachings. For example, it is a possible modification that the relation between the pivot and the bearing is reversed.

What is claimed is:

1. A folding cup holder comprising:

a base plate;

a pair of first arms each having proximal end portion pivotally supported to the base plate;

a pair of second arms each including a resilient latch portion and having proximal end portion pivotally supported to the base plate; and a holder arm including a pair of engagement portions at both ends thereof and pivotally supported to the distal ends of the first arms and the distal ends of the second arms in differential axes;

wherein the engagement portions are respectively engaged with the resilient latch portions so that the holder arm is kept in an expanded state; and the engagement portions are allowed to override the resilient latch portions so that the holder arm is released when excessive force is applied to the holder arm.

2. The folding cup holder according to claim 1, wherein the latch portions and the engagement portions are disposed near the axes of the holder arm and the second arms.

3. The folding cup holder according to claim 1, wherein the holder arm and the second arms comprise two pairs of pivots and bearings, each pivot including a key and each bearing including a keyway, and the keys and the keyways are not aligned to fit to each other at a position in a state where the holder arm is expanded so that the pivots are prevented from displacing from the bearings.

4. The folding cup holder according to claim 1, wherein the holder arm is disposed in an outer side of the second arms and in an inner side of the first arms.

5. The folding cup holder according to claim 1, wherein each of the first and second arms comprises a yoke portion integrally therebetween so as to be stiffened in a width direction.

* * * * *